Feb. 25, 1969         A. PHILLIPS         3,430,251
SEMIPERMANENT READOUT DEPTH RECORDER
Filed Oct. 17, 1967
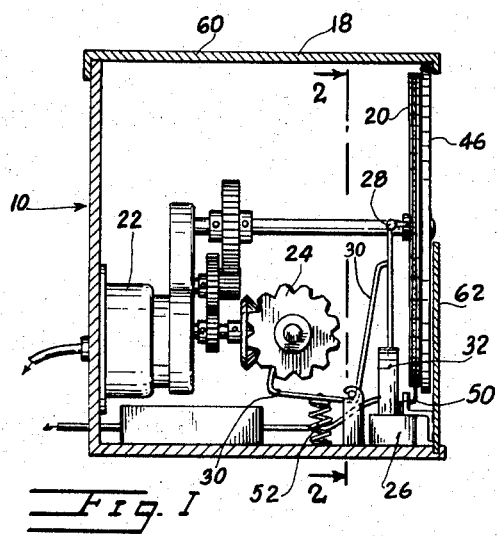
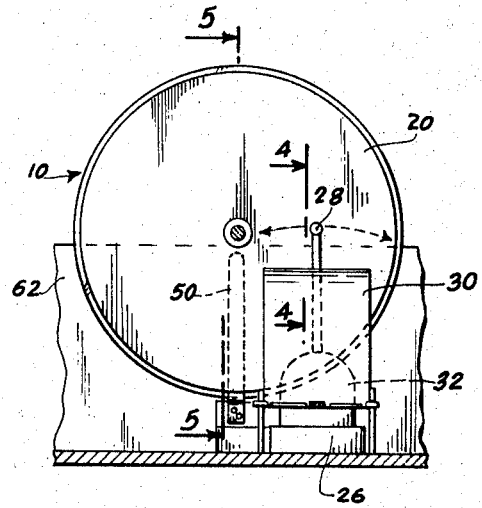
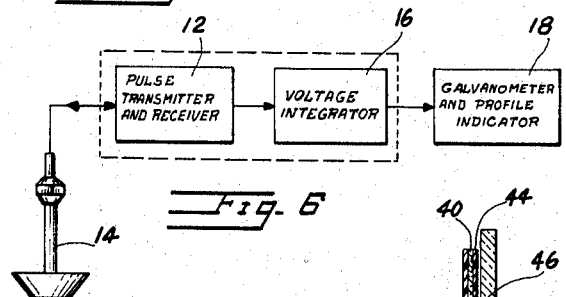
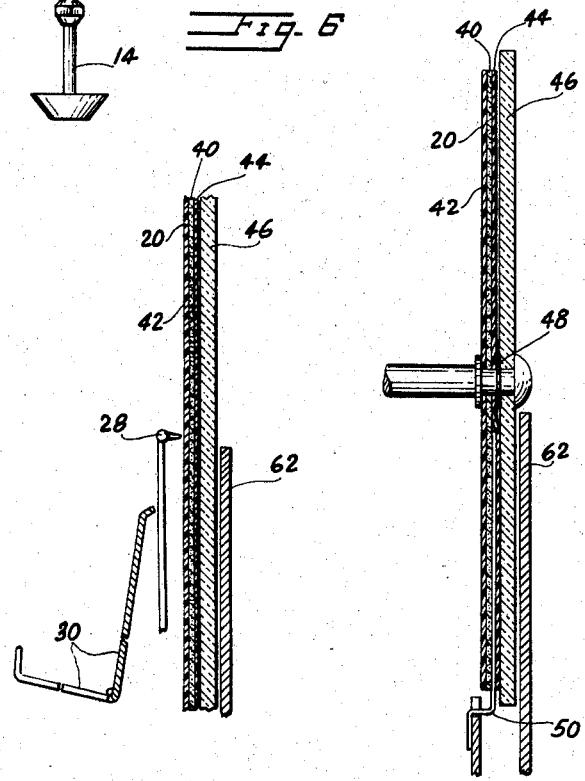
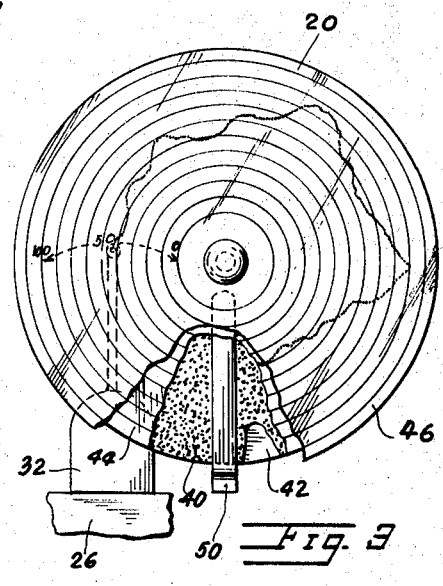
INVENTOR.
ADOLPH PHILLIPS
BY
ATTORNEY

United States Patent Office 3,430,251
Patented Feb. 25, 1969

3,430,251
SEMIPERMANENT READOUT DEPTH RECORDER
Adolph Phillips, 1100 Madison Ave.,
New York, N.Y. 10021
Filed Oct. 17, 1967, Ser. No. 675,818
U.S. Cl. 346—21                                    1 Claim
Int. Cl. G01d 9/00

ABSTRACT OF THE DISCLOSURE

An electro-mechanically operated image producing impressor for producing a succession of removable images on a multi-layer chart of a depth recorder from which the images may be successively removed.

BACKGROUND OF THE INVENTION

Field of the invention

Depth determining and recording devices for marine use.

Description of the prior art

Prior hereto depth or fathometer readouts could be described as falling into two broad classes. In the first class the desired information was permanently recorded on a chart such as, for example, that shown in United States Patent No. 3,048,848. When the roll of chart paper had been used once it had to be removed and either stored for future reference or destroyed. The frequency with which it was necessary to insert a fresh roll of chart paper depended upon the length of the roll and the speed at which it passed the recording position. It was virtually impossible to record on the same chart more than once. In the second class information was instantaneously and electronically displayed such as on a rotating neon discharge tube or on an indicating galvanometer.

SUMMARY OF THE INVENTION

The present invention for the first time combines the advantages of a reusable display for the recorded information while at the same time enabling information recorded thereon to remain for a desired length of time to provide at any one time continuity to the recorded pulses of information.

Accordingly, it is an object of the present invention to provide a reusable recording chart for depth recorders.

It is another object of the present invention to provide a display system whereby individual bits of information, which may be transmitted as pulses, are mapped as a continuum on a reusable chart.

It is a further object of the present invention to provide a mechanism for converting electrical pulses of information to an image mechanically formed on a reusable chart.

It is still another object of the present invention to provide an electro-mechanically controlled impact recording head.

Basically, and not by way of limitation, the present invention comprises a reusable recording chart of the type familiar as Magic Slate, in the form of a tacky wax filled plastic film sandwich erasable writing tablet, a clock mechanism for rotating the chart and an impacting tool synchronized with the rotation of the chart and a galvanometer pointer positionable in accordance with the electrical pulses of information. The impacting tool periodically strikes the galvanometer pointer which thereupon strikes the chart from behind to produce a series of point images at the front. As the chart rotates the individual point images become a continuum of information which remains visible until erased from the chart by separation of the front and rear plastic sheets. The chart illustrated is in the form of a disc but could also be in the form of an endless belt driven by rollers.

BRIEF DESCRIPTION OF THE DRAWING

In the drawing:

FIGURE 1 is a side view of the semipermanent readout depth recorder showing the clock mechanism, the galvanometer and the impacting tool mechanism, the exterior enclosure being shown in cross-section.

FIGURE 2 is a partial cross-sectional view taken across line 2—2 of FIGURE 1 showing portions of the galvanometer in phantom.

FIGURE 3 is a front view of the chart of the present invention partially cut away to show the laminar construction thereof and the construction of the erasing bar and showing portions of the galvanometer in phantom.

FIGURE 4 is a partial cross-sectional view taken across line 4—4 of FIGURE 2.

FIGURE 5 is a partial cross-sectional view taken across line 5—5 of FIGURE 2.

FIGURE 6 is a schematic representation of the various electrical portions of the present invention showing the transducer in full view.

DESCRIPTION OF A PREFERRED EMBODIMENT

Referring to the drawing, the semipermanent readout depth recorder 10 of the present invention comprises an electric pulse transmitter and receiver 12 which includes a transducer 14 for converting to, and transmitting, pulses of sonic energy and receiving such pulses after they have been reflected by some physical object which is usually the bottom of a body of water or a school of fish or the like. The time delay between transmission and reception is converted by a voltage integrator 16 into a current the magnitude of which is directly proportional to the distance between transducer 14 and the reflecting body. This current is fed into the galvanometer giving a scale reading proportionate to the depth.

A chart 20, shown in disc form, is connected by conventional means to a clock mechanism 22 which axially rotates chart 20 at a desired constant rate. Clock mechanism 22 also drives at a constant rate a sprocket wheel 24 which is disposed at a substantially right angle to the plane of chart 20.

An impacting tool is comprised of a base 26, an impact head 28 and a pivoting sprocket follower 30. Impact head 28 is the needle of a galvanometer 32.

Chart 20 is of a multi-layer construction. Center layer 40 is a thin tacky wax substance. Laminated to the rear surface of center layer 40 is a thin black plastic membrane 42. Situated adjacent the front surface of center layer 40 is a thin translucent plastic graph plate 44 upon which may be imprinted a suitable chart graph. Situated in spaced relation in front of plate 44 is a rigid transparent face plate 46, which serves as an anvil for impacting head 28 and shield against outside environment. A washer 48 situated between face plate 46 and graph plate 44 acts as a spacer.

A rigidly mounted blade 50 is located as a lowermost radius of chart 20 and extends from the circumference of chart 20 almost to the center thereof. Blade 50 is thin and flat the plane of which is parallel to the plane of chart 20. It is situated between center layer 40 and graph plate 44 thereby separating the two at the lowermost portion of chart 20 as chart 20 rotates. Such rotation is clockwise as viewed in FIGURE 3, counterclockwise as viewed in FIGURE 2. Due to the semiflexible nature of graph plate 44 and the pressure exerted by washer 48, graph plate 44 immediately returns to a position center layer 40 after passing knife 50.

OPERATION OF A PREFERRED EMBODIMENT

As sprocket 24 rotates, sprocket follower 30 under the action of a spring 52 moves forward to strike impact head 28 which normally swings freely to a position determined by the galvanometer current. Impact head 28 then is forced forward to strike the rear surface of chart 20. Since impact head 28 has a very small area of impression the force of the impact is transmitted through flexible membrane 42 and through center layer 40 thereby squeezing membrane 42 and graph plate 44 together at the point of impact where it is held by the center layer 40. In a manner familiar to children who have used erasable writing tablets of this nature, membrane 42 is visible through translucent graph plate 44 only at the point of impact.

The position of impact head 28 with respect to distance from the center of chart 20 is determined by the magnitude of the current passing through galvanometer 32 after having emanated from voltage integrator 16.

It is accordingly clear that a succession of impact points visible through face plate 46 and graph plate 44 become a continuum which is a graphic plot or profile of the distance between transducer 14 and the reflecting surfaces just passed. As the graph plot, the continuum of impact points, rotate with chart 20 to the position of blade 50 the separation of graph plate 44 from membrane 42 erases such graph plot thereby presenting a clean slate for repetitive recordation. The time delay between recording and erasure of any given point is determined by the rate at which chart 20 rotates and although such rate may be adjusted as desired between a matter of minutes or hours and a matter of days, one-half hour would be sufficient for most purposes.

Galvanometer and profile indicator 18 may be housed in an enclosure 60 which may be provided with an open front to expose chart 20 or with a lower shield 62 to block from view the lower portion of chart 20. Either graph plate 44 of face plate 46 or both may be provided with printed graph rulings and appropriate numerical scales. Additional printed surfaces may be provided with varying numerical scales to be interchangeable with that mounted on galvanometer and profile indicator 18.

What is claimed is:

1. A semipermanent readout depth recorder, comprising: a pulse transmitter receiver including a transducer, a voltage integrator connected to said transmitter receiver, and a galvanometer controlled profile indicator, said galvanometer and profile indicator being connected to said voltage integrator and receiving current pulses therefrom, said galvanometer and profile indicator including an erasable chart, a clockdrive rotating said chart, and an impacting tool striking said chart at its rear surface in timed intervals at points determined by said galvanometer; said chart comprising a base of a tacky wax, a flexible black membrane situated against the rear surface of said base, a flexible translucent graph plate situated adjacent the front surface of said base, and, situated in spaced relation in front of said graph plate, a rigid transparent face plate serving as an anvil for said impacting tool; and erasing means for separating base and graph plate, whereby at the points of impact depth recordations are retained on said chart for a predetermined length of time until they are erased therefrom.

References Cited

UNITED STATES PATENTS

| 2,897,037 | 7/1959 | Tolf | 346—21 |
| 3,011,854 | 12/1961 | Allen | 346—21 |
| 3,048,848 | 8/1962 | May | 346—78 |

RICHARD B. WILKINSON, Primary Examiner.

JOSEPH W. HARTARY, Assistant Examiner.

U.S. Cl. X.R.

346—102, 135